R. MESSLIN.
ELEVATOR FOR ASH CANS AND THE LIKE.
APPLICATION FILED JULY 23, 1909.
986,483.
Patented Mar. 14, 1911.
2 SHEETS—SHEET 1.
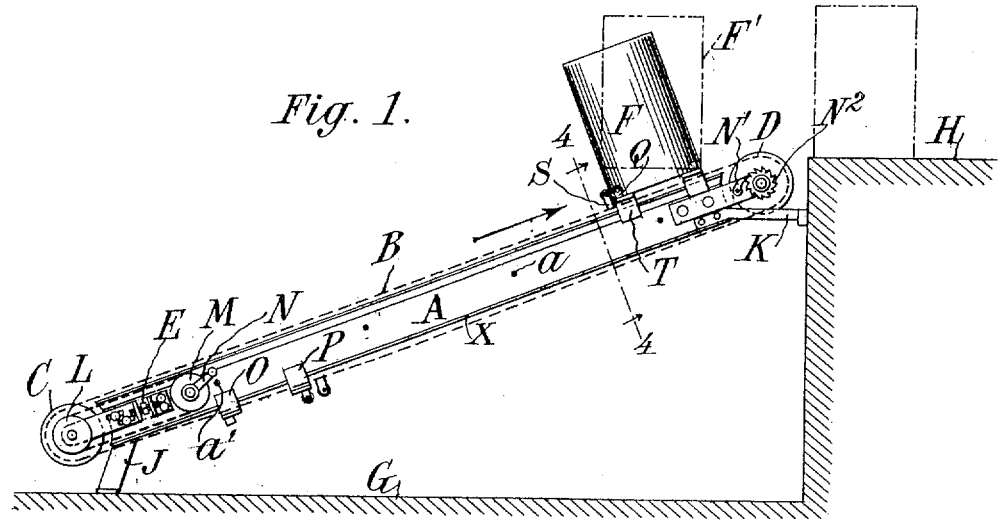
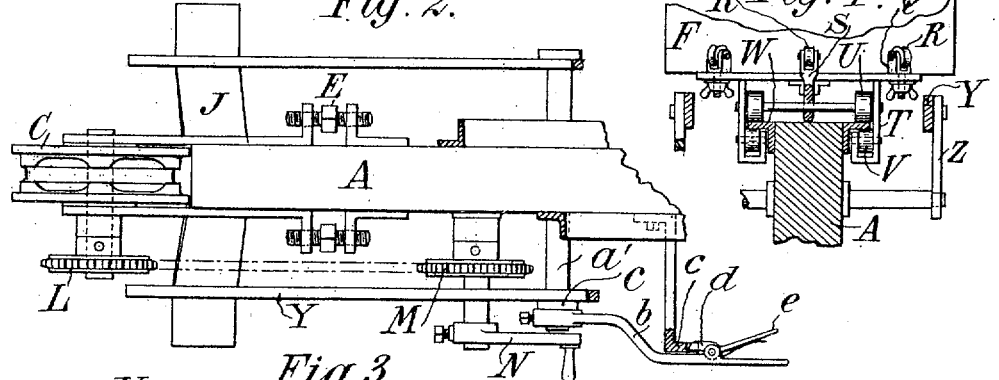
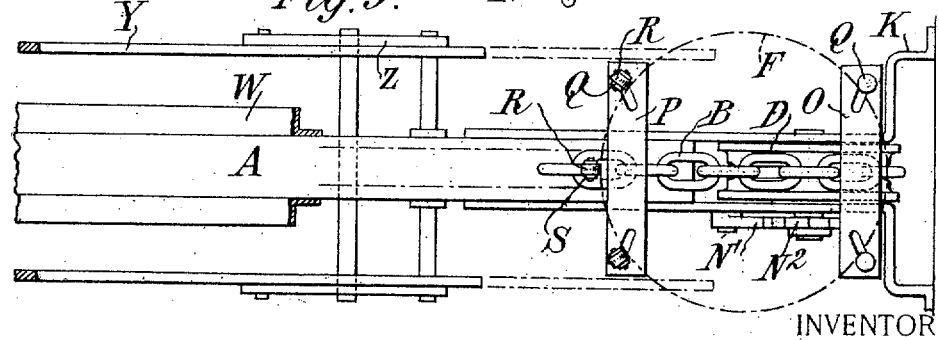
WITNESSES:
Fred White
René Buine
INVENTOR
Rudolph Messlin,
By Attorneys,
Arthur E. Frasert Usina R. MESSLIN.
ELEVATOR FOR ASH CANS AND THE LIKE.
APPLICATION FILED JULY 23, 1909.
986,483.
Patented Mar. 14, 1911.
2 SHEETS—SHEET 2.
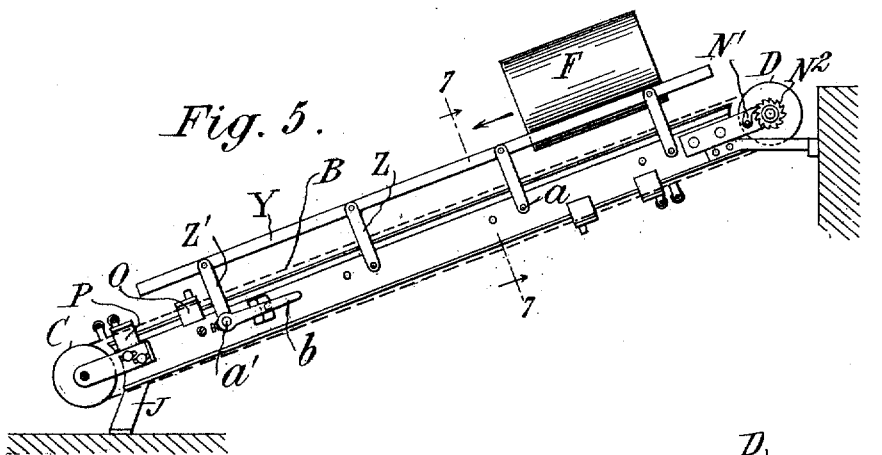
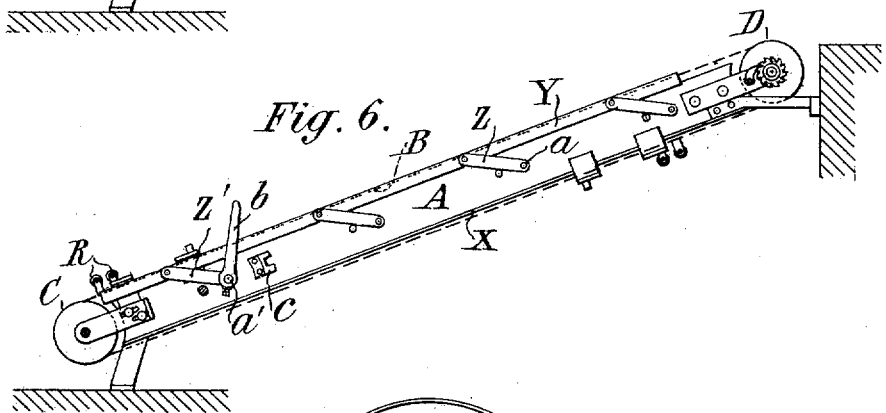
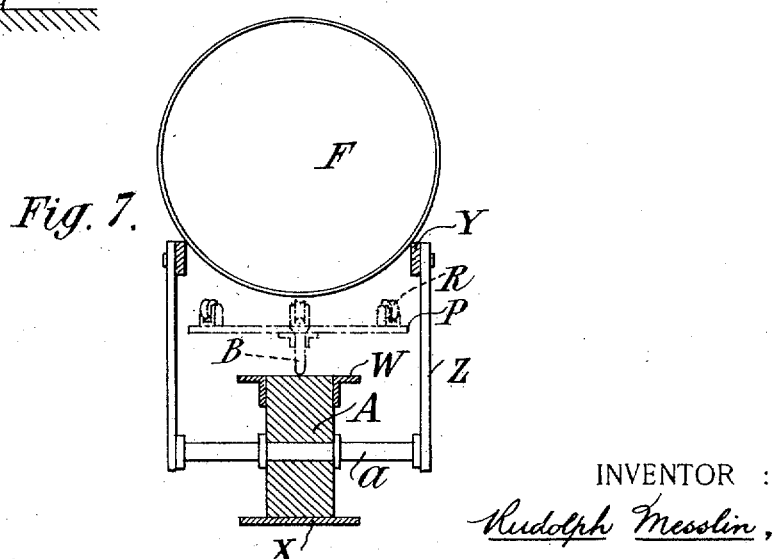
WITNESSES:
INVENTOR:
Rudolph Messlin,
By Attorneys,

UNITED STATES PATENT OFFICE.

RUDOLPH MESSLIN, OF NEW YORK, N. Y.

ELEVATOR FOR ASH-CANS AND THE LIKE.

986,483.  Specification of Letters Patent.  Patented Mar. 14, 1911.

Application filed July 23, 1909.  Serial No. 509,127.

*To all whom it may concern:*

Be it known that I, RUDOLPH MESSLIN, a subject of the Emperor of Austria-Hungary, residing in the borough of Manhattan, city, county, and State of New York, have invented certain new and useful Improvements in Elevators for Ash-Cans or the Like, of which the following is a specification.

This invention aims to provide certain improvements in inclined elevators preferably operated by hand, and preferably in combination with skids or equivalent means for safely returning the articles to the lower level.

The accompanying drawings illustrate an apparatus embodying the invention.

Figure 1 is a side elevation omitting the skids and supporting mechanism therefor; Fig. 2 is a plan of the lower end; Fig. 3 is a plan partly in section of the upper end; Fig. 4 is a cross-section approximately on the line 4—4 of Fig. 1; Figs. 5 and 6 are side elevations showing the skids in their operative and in their inoperative positions respectively; Fig. 7 is a cross-section on the line 7—7 of Fig. 5.

Referring to the embodiment of the invention illustrated, the apparatus is of the endless chain type, and the main support consists of a beam A, preferably an integral wooden beam of rectangular cross-section and extending continuously throughout the length of the elevator. A chain B runs upward over the top of the beam and downward under its bottom, and is guided by lower and upper pulleys C and D respectively at the ends of the beam; one of said pulleys, the lower one for example, being adjustable by means of the screws E or any other suitable mechanism to take up wear of the chain and keep it as taut as necessary. Any suitable means may be provided for propelling the chain and carrying the can F gradually up the incline. In fact in some situations it may be possible to push the can up directly. Preferably, however, the chain is driven by the lower pulley, which latter is turned by means of sprocket wheels L and M and a crank N near the lower end of the beam. For preventing backward movement a pawl N' is provided engaging a ratchet N² on the shaft of the upper sprocket wheel. Such a stop might equally well be provided at any one of various other points.

The apparatus shown is especially designed for elevating cans F of ashes or the like from a cellar floor G to an adjacent sidewalk H, though it may be used in a variety of situations and for elevating a variety of articles. The beam is supported by means of legs J resting upon the floor and legs K resting against the face of the sidewalk or the vertical cellar wall, which legs are spread apart as shown in Figs. 2 and 3 to permit the passage of the cleats hereinafter referred to.

For cans or similar articles there are preferably provided pairs of cleats O and P which are carried along with the chain and upon which the bottom of the can rests as in Fig. 3, these cleats being provided with uprights Q fastened in slots in the ends of the cleats so as to be adjustable obliquely toward the chain and to accommodate cans of different diameters, each of the rear uprights being preferably provided with a transverse roller Q which makes direct engagement with the can. The cleats O and P are firmly attached to the chain, and for cans of different sizes it is only necessary to adjust the uprights Q inward or outward. In addition a fixed upright S (preferably having a similar transverse roller) is provided directly upon a link of the chain and adapted to engage the rearmost point of the can. The upright S and the uprights on the cleat P push the can up. The uprights on the cleat O are useful only for steadying the can. The cleat P may be made thicker if desired so as to bring the rear edge of the can upward, and to bring the can to a vertical position F' (Fig. 1) or to an approximately vertical position, although a considerable inclination may be allowed without harm, especially where the can is fitted within the five uprights. The entire construction as before stated is carried upon a simple beam A. The cleats O and P extend a substantial distance to each side of the beam, and are guided by means of depending arms T (Fig. 4) carrying rollers U and V which respectively engage the top and bottom of flanges provided on the edges of the supporting beam. These flanges are provided at the upper edges by means of angle irons W fastened to the side faces of the beam, and at the lower edges by means of a plate X extending entirely across the base of the beam. Either the plate or the angle irons may be used at both top and bottom, or any other convenient constructions may be adopted, those shown being particularly easy of application to a wooden beam. With these guides the can is prevented from tilting laterally, and is carried easily along from the bottom to the top of the beam, where its nose engages the angle of the sidewalk and it is gradually pushed upon the sidewalk as the chain continues to advance. When this is accomplished the next pair of cleats O, P, is at the bottom of the beam, and the new can may be applied thereon. Only two pairs of cleats are necessary where it is desired to raise a single can at a time, as where the apparatus is to be worked by one man who has to place the cans on the elevator as well as to operate the crank.

For returning the empty cans a pair of cleats or some equivalent means for sliding the cans down gently is preferably provided. Such cleats are shown at Y extending alongside of the beam A in vertical planes just outside of the ends of the cleats O and P and adapted to be raised above the level of the cleats to the position of Figs. 5 and 7 or lowered to the position of Figs. 4 and 6. In the raised position the cleats Y support the can on its side at such an elevation that it clears the cleats and the upright rollers R so that it can slide freely down to the bottom and on to the floor G. In the lowered position the skids are out of the way so as to avoid interference with the can in its upward movement. The skids Y are mounted pivotally on the ends of a number of arms Z located in pairs on opposite sides of the beam A and connected by means of shafts $a$ passing through the beam. The lowermost of these shaft $a'$ is provided with an operating handle $b$ whereby the lowermost arms Z' can be swung upward or downward, carrying with them the skids Y, the other arms Z serving as supports and insuring a parallel motion of the skids. Means are provided for locking the arm $b$ so as to hold the skids up in operative position, such means consisting of a notched plate $c$ carried by the beam, and a pivoted tooth $d$ carried by a spring-actuated gripping lever $e$ on the handle $b$. When the lever $e$ is gripped the handle $b$ may be swung freely. When it is swung down to bring the tooth $d$ in register with the notch in the plate $c$ and is released, it springs into this notch and holds the parts locked as in Fig. 5.

A speed reducing gear may be provided between the crank and the chain so as to make possible the lifting of heavy weights without too great an effort. It is within the main principle of the invention to utilize I-beams or built-up metal constructions in place of the wooden beam A with its metal flanges.

Various other changes may be made in details and in the arrangement and combination of the parts by those skilled in the art, without departing from the invention.

What I claim is:—

1. An apparatus of the character described, including in combination an inclined elevator and skids permanently attached thereto, said elevator and skids being proportioned for use with the same articles and adapted to be brought alternately into operative position, so that such articles may be elevated and lowered by the same apparatus.

2. An inclined elevator in combination with skids upon which the articles elevated on the elevator may be lowered, said skids being movable to operative position to support such articles above the elevator and to inoperative position below the path of articles carried by the elevator.

3. An inclined elevator including an inclined support and means extending along the upper face thereof for elevating articles, and skids supported from the sides of said support and movable to positions above and below the path of articles carried by said elevating means.

4. An apparatus of the character described, including in combination an inclined elevator and skids permanently attached thereto and adapted to be brought alternately into operative position, said elevator and skids being proportioned so that the former supports cans in an approximately upright position and the skids support the same cans on their sides, so that such cans may be elevated in upright position and lowered on their sides by the same apparatus.

5. An inclined elevator including an integral beam, a continuous chain extending over the top and bottom and around the ends of said beam, guide pulleys for said chain fastened on the ends of said beam, cleats carried by said chain for engaging the articles to be lifted and longitudinal guides on said beam for guiding said cleats, said beam supporting the weight of said chain and of the articles carried thereby.

6. An inclined elevator including an integral beam, a continuous chain extending over the top and bottom and around the ends of said beam, guide pulleys for said chain fastened on the ends of said beam, cleats carried by said chain for engaging the articles to be lifted and longitudinal guides on said beam for guiding said cleats, said beam supporting the weight of said chain and of the articles carried thereby, and legs at the ends of said beam adapted to support said ends respectively against a floor and a vertical wall, said legs at each end being separated by a distance greater than the width of the beam so as to permit the passage of the chain and cleats.

7. An inclined elevator including an integral wooden beam A, a continuous chain B extending over the top and bottom and around the ends of said beam, guide pulleys C and D for said chain fastened on the ends of said beam, cleats carried by said chain for engaging the articles to be lifted, and longitudinal metal guides on said beam for guiding said cleats.

In witness whereof, I have hereunto signed my name in the presence of two subscribing witnesses.

RUDOLPH MESSLIN.

Witnesses:
D. ANTHONY USINA,
FRED WHITE.

Copies of this patent may be obtained for five cents each, by addressing the "Commissioner of Patents, Washington, D. C."